United States Patent [19]

Ikhsanov et al.

[11] 4,218,044
[45] Aug. 19, 1980

[54] PIPELINE LIFTING DEVICE

[76] Inventors: Deviz F. Ikhsanov, ulitsa Tsjurupy, 110, kv.77; Vladimir L. Buzhinsky, ulitsa Shafeeva, 12/1, kv. 127; Konstantin E. Raschepkin, ulitsa R. Zorge, 37, kv. 67, all of Ufa; Vasily K. Galjuk, Sevastopolsky prospekt, 83, korpus 2, kv. 37, Moscow, all of U.S.S.R.

[21] Appl. No.: 958,266

[22] Filed: Nov. 6, 1978

[51] Int. Cl.² .............................................. F16L 1/00
[52] U.S. Cl. ................................. 254/93 R; 405/154
[58] Field of Search ................... 254/29 R, 93 R, 134, 254/89 H; 405/173, 184, 154; 29/234, 244

[56] References Cited
U.S. PATENT DOCUMENTS 4,020,641  5/1977  Takada .................... 254/29 R X Primary Examiner—Robert C. Watson
Attorney, Agent, or Firm—Steinberg and Blake

[57] ABSTRACT

The device comprises a detachable sling consisting of an upper part and a lower part. The upper part carries a self-propelled trolley. The lower part of the sling is articulated by links with supporting shoes also articulated to each other by links. The shoes are arranged symmetrically with relation to the longitudinal axis of the pipeline and are moved by hydraulic cylinders, both ends of each cylinder connecting the lower part of the sling with one of the shoes by means of ball joints. Both parts of the sling are interconnected with each other by projections and slots installed, respectively, on the upper and lower parts of the sling.

4 Claims, 4 Drawing Figures

PIPELINE LIFTING DEVICE

The present invention relates to mechanisms intended for servicing trunk pipelines, and more particularly, to a device for lifting a pipeline.

The present invention will be especially efficient in major repairs of operating trunk lines for lifting individual sections of said pipelines from the ditch in order to create a required working gap between the ditch bottom and the pipeline for subsequent installation on said pipeline of a machine for removal of the old coating from the pipeline surface and then of devices for applying a new insulating coating.

The previous practice adopted over the world consisted in repairing the outer coating of the trunk pipelines by replacing the defective sections with new ones. This, however, called for stopping temporarily the delivery of the product conveyed by the pipelines (e.g. petroleum, gas) and reduced their capacity accordingly. Therefore, the most pressing problem today lies in organizing major repairs of the external coating of trunk pipelines without stopping the conveyance of the product during repairs.

Known in the prior art are pipeline-lifting devices comprising a self-propelled trolley capable of moving along the surface of the pipeline, an integral sling mounted on the frame of said self-propelled trolley, hydraulic power cylinders designed for lifting the pipeline and connected with the sling and with a support.

In these devices the support has the form of a solid plate, the sling is constituted by a rigid cradle embracing the pipeline and fastened to the frame of the self-propelled trolley while the hydraulic power cylinders are articulated to the sling and rigidly connected to the supporting plate.

This device functions as follows. When the rods of the power cylinders secured to the lower part of the sling are extended, the supporting plate rigidly secured to the barrels of said power cylinders comes to bear against the ditch bottom thus holding the pipeline above the ground. Displacement of the device along the pipeline is effected with the aid of another device which is identical with the first one and supports the pipeline while the first device is moved to a new section of the pipeline.

These prior art devices are installed on the pipeline from the end of the pipe and can, therefore, be utilized only at the pipeline construction stage.

Another disadvantage of such devices lies in that they have rigid connections between the sling, power cylinders and support so that in the course of pipeline lifting the device is subjected to considerable overloads while the pipeline secured by said rigid ties cannot move in a lateral direction (for example due to heat expansion) which again builds up additional stresses that might lead to emergency situations.

In addition, when the device is shifted over to the transport position, the supporting plate creates considerable additional loads arising at the moment when the plate breaks off from the ground.

It is an object of the present invention to ensure steady position of the pipeline being lifted.

Another object of the invention lies in reducing the loads on the pipeline at the moment when the support breaks away from the ground.

Still another object of the invention is to widen the technological capabilities of the device and cut down the expeditures for major overhauls of the pipeline.

These and other objects are achieved by providing a pipeline-lifting device comprising a self-propelled trolley installed with a provision for moving along the pipeline and a sling fitted around the pipeline and connected by power cylinders with a support wherein, according to the invention, the support is made in the form of two shoes arranged symmetrically with regard to the longitudinal axis of the pipeline and connected by links with said sling, each of said power cylinders being articulated at one end to the sling while its other end is articulated to one of the shoes with a provision for its turning across the longitudinal axis of the pipeline.

The present invention increases considerably the steady equilibrium of the pipeline while it is being lifted out of the ditch. The articulation of the ends of the power cylinders to the sling and shoes allows the latter to move across the longitudinal axis of the pipeline which reduces considerably the load on the pipeline.

It is highly prectable that said sling should be made of a detachable type consisting of an upper detachable part carrying a frame with a self-propelled trolley, and a lower detachable part to which said links and power cylinders are connected.

The dismountable construction of the sling allows the device to be used for lifting an operating pipeline during major repairs and permits the upper part of the sling with the self-propelled trolley to be used for work with several lower parts of the device installed along the pipeline.

In one of the embodiments of the invention the upper part of the sling has the form of a rocker whose ends are provided with longitudinal projections of a T-shaped cross section while the ends of the lower part of the sling have longitudinal through slots receiving said projections when both parts of the sling are joined together.

Such a construction of the joint between the upper and lower parts of the sling facilitates installation of said sling on an operating pipeline and makes it possible to lift the pipeline with the aid of one upper part and several lower parts of the sling spaced along the pipeline.

In another embodiment of the invention each shoe consists of two cross members in the form of cylindrical segments secured on a convex foot, the shoes being connected to each other and to the sling by three pairs of cross links, two of which articulate the lower part of the sling to the shoes while the third pair articulates the opposite sides of the shoes to each other.

This kind of kinematic linkage allows the shoes during pipeline lifting to roll on their convex supporting surfaces in the direction from the middle of the ditch towards its walls which widens the supporting base of the device and, consequently, its lateral stability; when the supporting shoes are lifted for shifting the device to the transport position said shoes roll in the opposite direction which facilitates their separation from the ground and self-cleaning.

The articulated jointing of both ends of each power cylinder may consist of ball joints.

The power cylinders can be constituted by hydraulic cylinders whose rods are connected with the shoe foot while the cylinder proper is connected to the lower part of the sling.

Other objects and advantages of the present device will become apparent from the detailed description of the invention by way of example with reference to the accompanying drawings, in which:

FIG. 1 is a schematic general front view of the device in the working position according to the invention;

FIG. 2—same, side view;

Figure 1:
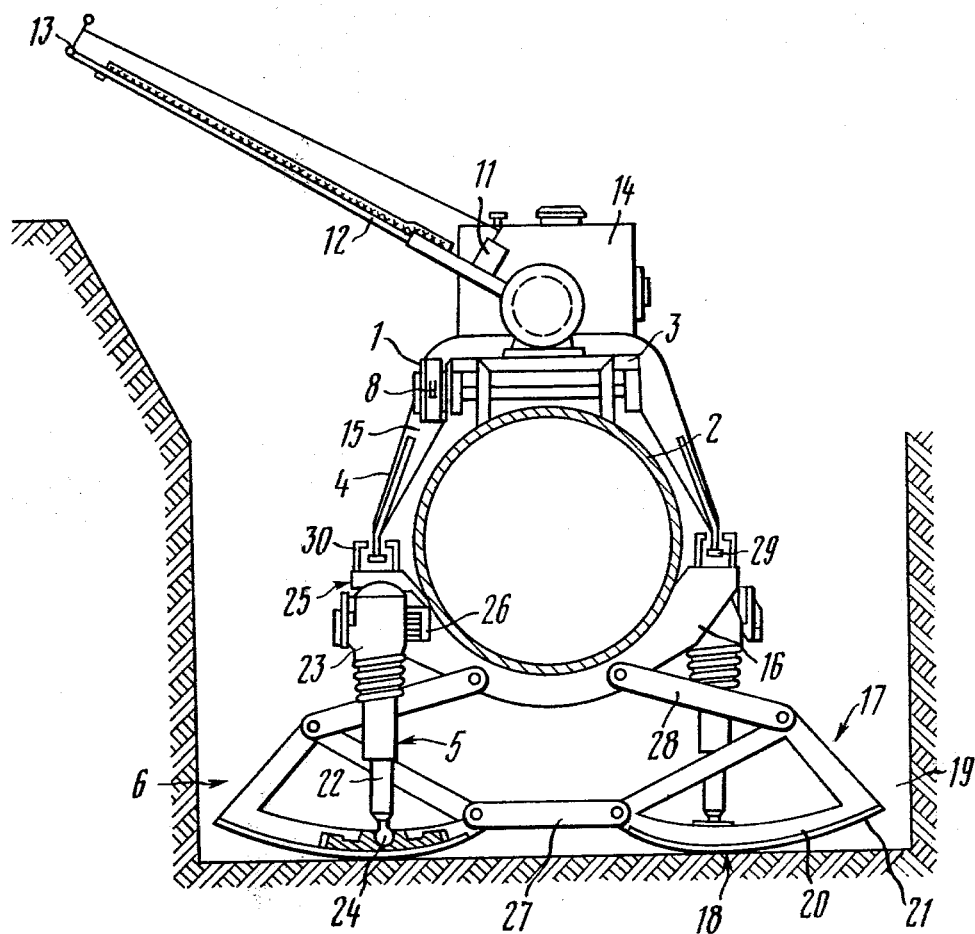

The device comprises a self-propelled trolley 1 (FIG. 1) installed with a provision for moving along the surface of a pipeline 2. The frame 3 of the self-propelled trolley 1 mounts a sling 4 connected by hydraulic cylinders 5 with a support 6.

Figure 2:
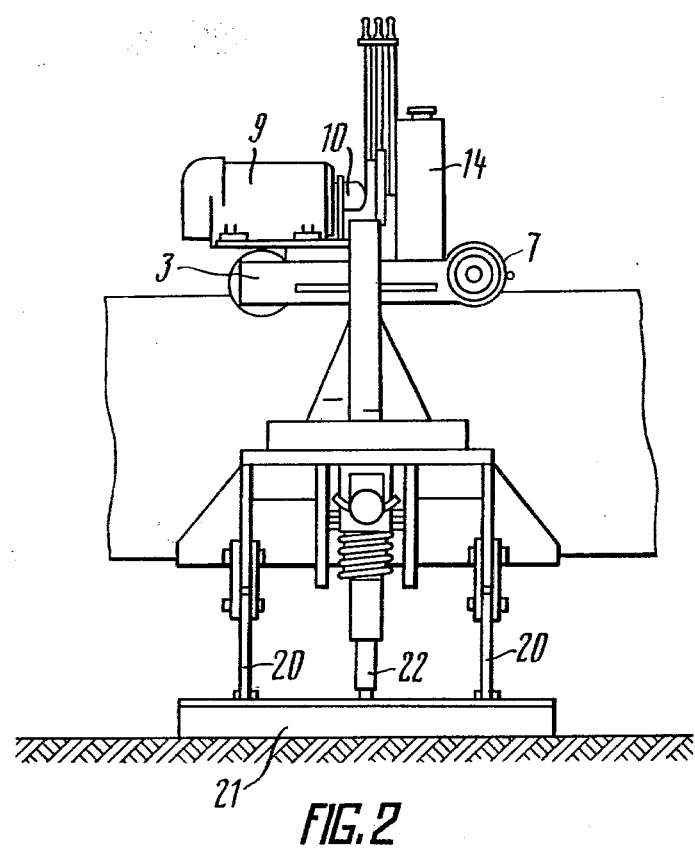

The frame 3 of the self-propelled trolley 1 carries a running gear 7 (FIG. 2) with a hydraulic motor 8 (FIG. 1), a pumping plant comprising an electric motor 9 (FIG. 2), a hydraulic pump 10, a distributor 11 (FIG. 1) mounted on a telescopic rod 12 and a remote-control panel 13 of the device, installed on the end of said telescopic rod 12. Besides, the frame 3 of the self-propelled trolley supports a tank 14 with oil for the hydraulic cylinders 5.

The slng 4 consists of an upper detachable part 15 and a lower detachable part 16, both of which embrace the pipeline 2, the upper part 15 having the form of a rocker and being rigidly secured to the frame 3 whereas the lower part 16 has the form of a cradle to fit the shape of the pipe 2.

The support 6 of the device consists of two supporting shoes 17 arranged symmetrically with regard to the axis of the pipeline 2 and having a convex supporting surface 18.

The supporting shoes 17 are kinematically linked with each other and with the lower part 16 of the sling 4 being capable of turning across the longitudinal axis of the ditch 19 into which the pipeline 2 is laid.

Each hydraulic cylinder 5 is articulated with the lower part 16 of the sling 4 and the corresponding supporting shoe 17.

Each shoe 17 consists of two cross members 20 in the form of cylindrical segments interconnected by a convex foot 21.

Each hydraulic cylinder 5 is installed between the cross members 20 of the corresponding supporting shoe 17 and its rod 22 is articulated with the foot 21 of the shoe 17 while the cylinder proper 23 of said hydraulic cylinder 5 is articulated to the lower part 16 of the sling 4.

Articulation of the rod 22 of each hydraulic cylinder 5 with the foot 21 of the supporting shoe 17 consists of a ball joint 24 while the cylinder 23 is connected with the lower part 16 of the sling 4 by another ball joint 25. The cylinder 23 of each hydraulic cylinder 5 is provided with a spring 26 at the point of its connection with the lower part 16 of the sling 4, said spring being intended to hold the hydraulic cylinder 5 in the joint 25 when the device is in the transport position.

The kinematic linkage of the shoes 17 with each other and with the lower part 16 of the sling 4 consists of three pairs of cross links 27,28 wherein the ends of one pair of links 27 are articulated with the lower inner ends of the cross members 20 of the supporting shoes 17 whereas the ends of the two other pairs of links 28 are articulated with the upper ends of said cross members 20 of the shoes 17 and with the lower part 16 of the sling 4.

The relationship between the lengths of the links 27 and 28 and the relative positions of the joints is selected so that the shoes 17 break off from the ground not at the entire supporting surface 18 but beginning from its inner edge which facilitates the working conditions of the cylinders 5 and reduces the load on the pipeline 2. To ensure a dismountable jointing of the upper 15 and lower 16 parts of the sling 4, its upper part 15 has the form of a rocker whose ends are provided with longitudinal projections 29 (FIGS. 1,3,4) T-shaped in cross section while the ends of the lower part 16 of the sling 4 have longitudinal through guides 30 receiving said projections 29.

The self-propelled trolley 1 together with the upper part 15 of the sling 4 and the mechanisms mounted on the frame 3 of the trolley 1 constitutes the upper part of the device.

The lower detachable part of the device has the form of a closed symmetrical articulated six-bar mechanism formed by the lower part 16 of the sling 4, two pairs of links 28, supporting shoes 17 and a pair of links 27.

The device functions as follows.

The device is mounted on a section of the operating trunk pipeline 2 after said pipeline has been completely uncovered and after digging a pit of a sufficient size for accommodating the lower part of the device under the pipeline 2.

Figure 3:
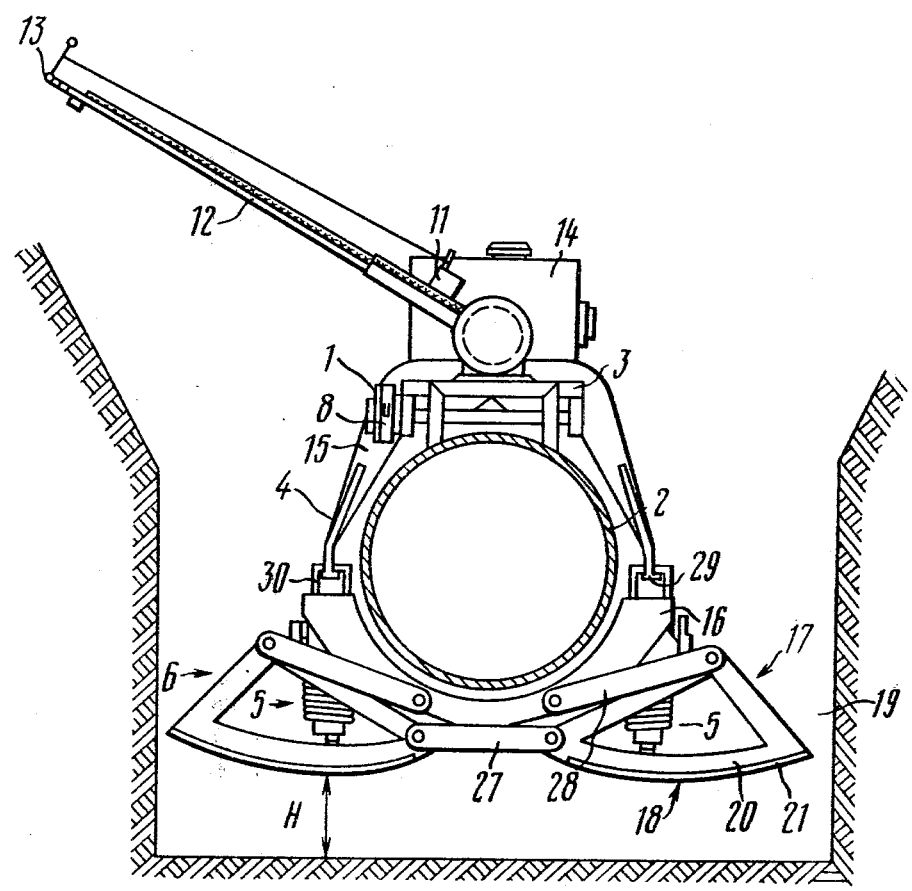
FIG. 3 shows the device in the transport position, front view.
Figure 4:
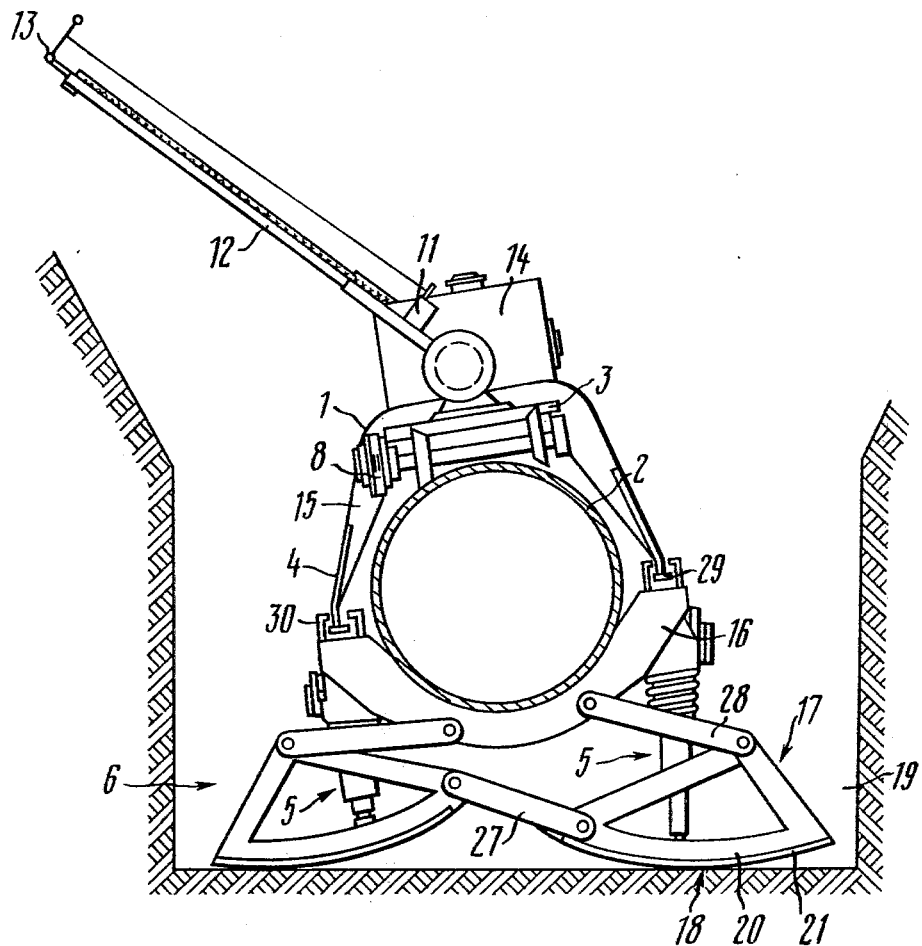
FIG. 4 shows the device in the working position, front view.

Before installation of the device its lower and upper parts are detached from each other. In the initial position the shoes 17 are pressed by the hydraulic cylinders 5 against the lower part 16 of the sling 4 (as shown in FIG. 3).

To install the lower part of the device on the pipeline 2, said part is turned by a lifting crane with the cradle pointing down and installed on the pipeline 2; then it is turned around the pipeline 2 for putting it on the bottom of the ditch.

Then the upper part of the device is placed side by side on the pipeline 2 so that the wheels of the self-propelled trolley 1 rest on the surface of the pipeline 2 and the hydraulic cylinders 5 are connected by hoses to the distributor 11.

Now the electric motor 9 is turned on from the control panel 13 and the hydraulic power cylinders 5 are set in operation for pressing the lower part 16 of the sling 4 against the pipeline 2. Then the hydraulic drive 8 of the self-propelled trolley 1 is turned on from the control panel 13 and the self-propelled trolley 1 is moved along the pipeline 2 until the T-shaped slots 29 on the upper part 15 of the sling 4 engage the corresponding guides 30 on its lower part 16. In this form the device is ready for operation.

The hydraulic cylinders 5 are turned on and the pipeline 2 starts rising; as the rods 22 extend from the hydraulic cylinders 5, the ends of said rods 22 come to bear against the foot 21 of the supporting shoes 17 and, interacting with the lower part 16 of the sling 4, lift the pipeline 2 high enough for convenience of repair work.

In the course of pipeline lifting the supporting shoes 17 interact by their supporting surface 18 with the bottom of te ditch 19, turn across the pipeline axis, rolling over the bottom of the ditch 19 towards its walls which enlarges the supporting base of and stability of the device. Then another identical device is installed side by side with the first one and made ready for lifting the pipeline 2 as required.

The first device is shifted over to the transport position by turning on the hydraulic cylinders 5; the rods 22 being retracted into the cylinder 23, break off the supporting shoes 17 from the bottom of the ditch 4 so that the lower part 16 of the sling 4 starts hanging with its guides 30 on the projections 29 of the upper part 15 of the sling 4 and forms a gap between the cradle of the lower part 16 and the lower generatrix of the pipeline 2 thus permitting free movement of the device along the pipeline 2. The distance between the device installed on the pipeline 2 is found by calculations, depending on the diameter and strength of the pipeline 2 being repaired.

The elongated shape of the guides 30 and projections 29 makes it possible to retain a uniform gap between the device and the ditch bottom in the course of transportation of the device. Then the displaced device is installed for lifting the pipeline as described above, the other device is shifted to the transport position and installed side by side with the first device which completes the entire cycle of movement of two identical devices along the gradually lifted section of the pipeline 2.

The quantity of the simultaneously used lower (operating) parts of the device which interact during their movement along the pipeline must be not less than two.

The hydraulic system of the claimed device incorporates conventional valves which permits safe disconnection of the hydraulic pipes from the upper (power-producing) part from the loaded hydraulic cylinders 5 located in the lower (operating) part of the device. This ensures pressuretightness of the detached parts of the hydraulic system and locks in position the rods 22 of the power cylinders 5 (for example in case of a sudden pressure drop in the hydraulic piping).

The claimed invention makes it possible to use a group of identical devices for pipeline repairs in the capacity of portable, semistationary or stationary supports which are served by a single upper (power-producing) part moving consecutively along the pipeline from one support to another.

What is claimed is:

1. A device for lifting a pipeline comprising: a frame carrying a self-propelled trolley installed with provision for moving along said pipeline; a sling embracing said pipeline; a supporting appliance in the form of two shoes arranged symmetrically with relation to the longitudinal axis of said pipeline and connected by links with said sling; at least two power cylinders, one end of each of said cylinders being articulated with a respective one of said shoes with provision for its turning across the longitudinal axis of said pipeline whereas the other end of each of said cylinders is articulated with said sling.

2. A device according to claim 1 wherein said sling comprises two detachable parts including an upper part carrying said frame with said self-propelled trolley and a lower part having said rods and power cylinders connected thereto.

3. A device according to claim 2 wherein the upper detachable part of the sling is made as a rocker having at the ends thereof longitudinal projections of a T-shaped cross section while the lower detachable part of the sling has longitudinal through guide slots which receive said projections when both parts of the sling are joined together.

4. A device according to claim 1 wherein each shoe comprises two cross members in the form of cylindrical segments secured to a convex foot, said shoes being connected to each other and to the sling by three pairs of cross links two of which articulate the lower part of the sling with the shoes while the third pair of links articulates the opposite sides of the shoes to each other.

* * * * *